United States Patent Office 3,492,296
Patented Jan. 27, 1970

3,492,296
3-LOWER ALKOXY-2H-1,2-BENZOTHIAZIN-4-(3H)-ONE 1,1-DIOXIDE
Harold Zinnes, White Meadow Lake, John Shavel, Jr., Mendham, and Martin S. Sternberg, Chester, N.J., assignors to Warner-Lambert Pharmaceutical Company, Morris Plains, N.J., a corporation of Delaware
No Drawing. Original application Sept. 11, 1967, Ser. No. 666,949. Divided and this application Apr. 4, 1969, Ser. No. 813,713
Int. Cl. C07d 93/02; A61k 19/02
U.S. Cl. 260—243        4 Claims

ABSTRACT OF THE DISCLOSURE

A 3-lower alkoxy-1,2-benzothiazin of the formula:

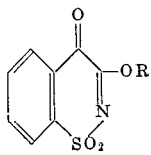

wherein R is lower alkyl.
These compounds are useful as an inhibitor of the enzyme urease.

---

This application is a divisional application of our co-pending application, U.S. Ser. No. 666,949, filed Sept. 11, 1967.

The present invention relates to novel 3-alkoxy-2H-1,2-benzothiazin-4(3H)-one 1,1-dioxides of the formula:

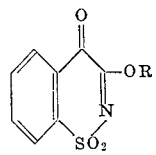

wherein R is lower alkyl of 1 to 6 carbon atoms, preferably methyl.

The compounds of this invention are prepared by treating a compound of the formula:

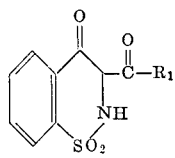

wherein $R_1$ is lower alkyl, for example, methyl, ethyl, propyl, and the like, or aryl, for example pheny, by one of the two processes described below.

In the first method, compound II is treated with silver carbonate in a lower alkanol solvent at reflux temperature of the solvent.

The second method comprises treating compound II with tert-butyl hypochlorite in a lower alkanol solvent at a temperature such as from 20 to 30° C.

The compounds of this invention are potent inhibitors of the enzyme urease and as such are useful in the oral treatment of ammonemic states found in severe liver disease or certain complications of uremic syndrome such as uremic colitis.

The compounds act by inhibiting bacterial urease, for example, that produced by Proteus in the gastro-intestinal tract. They thereby prevent ammonia formation and concomitant systemic reabsorption of ammonia.

Because of their relative insolubility in the gastrointestinal fluid and their ability to act at low pH, the 1,2-benzothiazine derivatives of this invention also inhibit urease present in the stomach.

The benzothiazine derivatives of this invention are to be administered orally to a mammal having a body weight of about 70 kg. at a dosage of about 250 to 700 mg. several times daily. The dosage may be adjusted in an amount sufficient to prevent or mitigate signs and symptoms of acute hepatic encephalopathy or to lower blood ammonia levels.

The benzothiazine derivatives may also be administered in cases of long term chronic hepatic encephalopathy in divided doses with a total daily intake of about 1 gm. in order to permit larger protein intakes among those individuals abnormally sensitive to increases of dietary protein because of high blood ammonia. Likewise, it may be used as a medicinal supplement in cases of uremic syndrome where ammonemia is a problem.

In use, the compounds of this invention are combined with an inert pharmaceutical carrier, such as lactose, dicalcium phosphate, mannitol and compounded into dosage forms such as tablets, pills, capsules and the like according to the pharmacist's art. They may also be combined with other inert pharmaceutical diluents, such as water, syrup, and formulated to liquid dosage forms, such as suspensions and the like.

The starting compound II is prepared by treating a saccharin derivative of the formula:

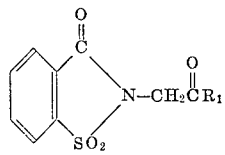

with an alkali metal alkoxide, such as sodium ethoxide in a lower alkanol solvent such as ethanol at a temperature of from about 50 to 55° C. The reaction is completed by neutralizing the excess base in the reaction media by the addition of an acid. See also Zinnes et al., J. Org. Chem., vol. 29, pp. 2068–70 (1964).

The following examples are included in order further to illustrate the invention. Room temperatures referred to therein are from about 20 to 30° C.

EXAMPLES 3-methoxy-1,2-benzothiazin-3H-4-one 1,1-dioxide prepared by the silver carbonate method A mixture of 24 g. (0.1 mole) of 3-acetyl-2H-1,2-benzothiazin-4(3H)-one 1,1-dioxide, 25 g. (0.15 mole) of silver carbonate and 750 ml. of methanol is refluxed with stirring for 4 hours. The mixture is filtered while hot and the filtrate allowed to stand at room temperature. The off-white crystals which separate are collected to give 10.1 g. of produce, M.P. 210–217° C. dec. (sinters at 205°). Recrystallization from methanol gives material, M.P. 213–218° C. dec. (sinters at 205°).

Analysis.—Calcd. for $C_9H_7NO_4S$; C, 48.01; H, 3.13; N, 6.22; S, 14.24. Found: C, 48.29; H, 3.28; N, 6.26; S, 14.19.

Prepared by the tert-butyl hypochlorite method

A suspension of 12.0 g. (0.1 mole) of 3-acetyl-2H-1,2-benzothian-4(3H)-one 1,1 dioxide in 100 ml. of methanol is protected from light and 50 ml. of 50% (w/v.) tert-butyl hypochlorite in carbon tetrachloride is added slowly with sufficient cooling to maintain room temperature. The resulting solution is allowed to stand at room temperature for two hours and then refrigerated. On stirring and scratching there is obtained 7.3 g. of product, M.P. 213–218° C. dec. (sinters at 205°).

What we claim is:
1. A compound of the formula:

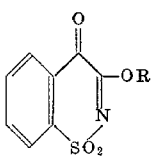

wherein R is lower alkyl.

2. The compound of claim 1 wherein R is methyl.
3. A process for the production of the compound of claim 1 which comprises refluxing a compound of the formula:

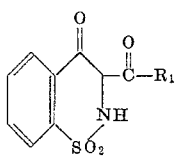

wherein $R_1$ is lower alkyl or aryl with silver carbonate in a lower alkanol solvent.

4. A process for the production of a compound of claim 1 which comprises treating a compound of the formula:

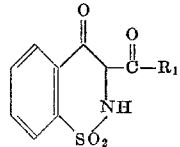

where $R_1$ is lower alkyl or aryl with tert-butyl hypochlorite in a lower alkanol solvent at a temperature of 20 to 30° C.

References Cited
UNITED STATES PATENTS 3,284,450   11/1966   Kraaijeveld et al. ____ 260—243

OTHER REFERENCES

Abe et al.; J. Pharm. Soc., Japan, vol. 76, pp. 1058–63 (1956).

HENRY R. JILES, Primary Examiner
JOHN M. FORD, Assistant Examiner

U.S. Cl. X.R.

260—999